(No Model.)
J. WEIGEL.
TELEPHONE.
No. 578,670.  Patented Mar. 9, 1897.
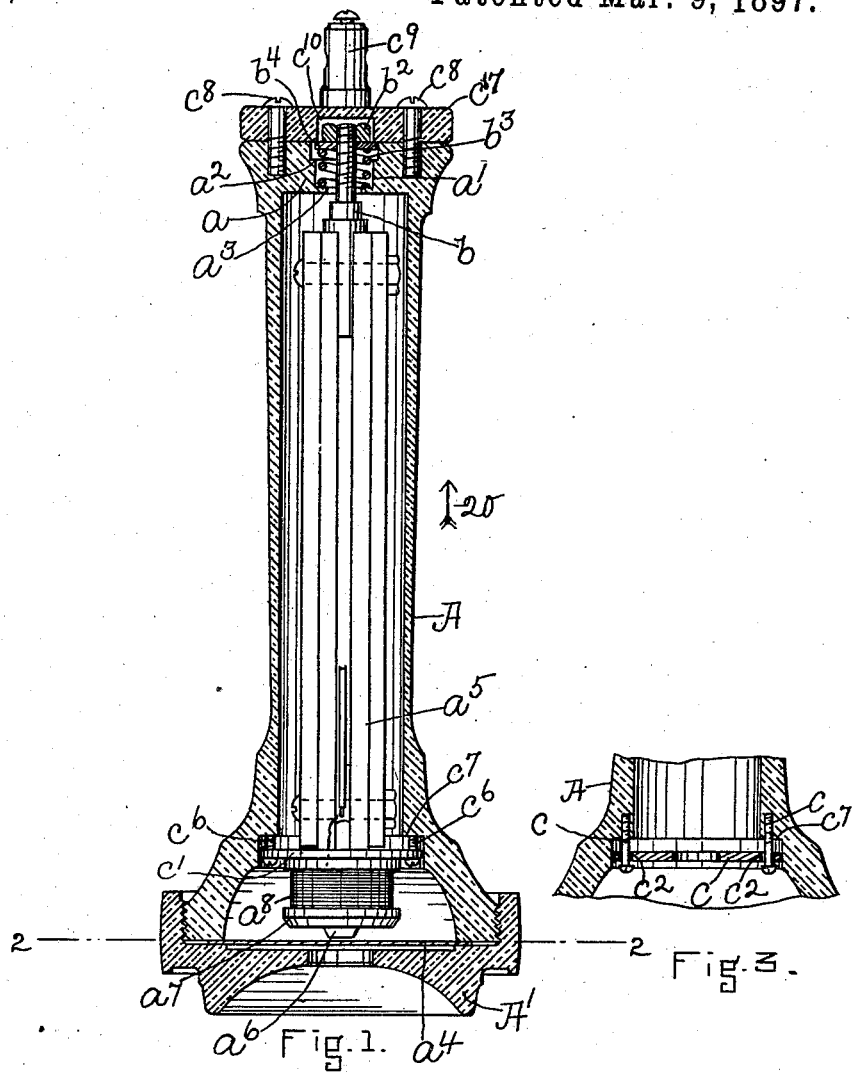
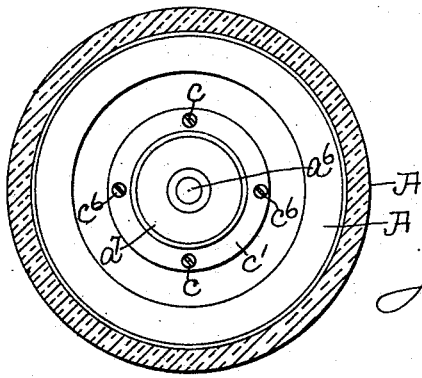
WITNESSES.
Matthew M. Blunt
J. Murphy
INVENTOR.
John Weigel
By Jas. H. Churchill
ATT'Y.

United States Patent Office.

JOHN WEIGEL, OF BOSTON, MASSACHUSETTS, ASSIGNOR OF ONE-HALF TO
BENJAMIN F. COLBY, OF SAME PLACE.

TELEPHONE.

SPECIFICATION forming part of Letters Patent No. 578,670, dated March 9, 1897.

Application filed July 14, 1896. Serial No. 599,093. (No model.)

*To all whom it may concern:*

Be it known that I, JOHN WEIGEL, residing at Boston, in the county of Suffolk and State of Massachusetts, have invented an Improvement in Telephones, of which the following description, in connection with the accompanying drawings, is a specification, like letters on the drawings representing like parts.

This invention relates to an improvement in that class of telephones known as "hand-phones," and has for its object to provide an instrument the parts of which are capable of expanding and contracting without disturbing the relative position or equilibrium of the usual diaphragm and the pole-piece, whereby the distance between the said diaphragm and the pole-piece may be maintained substantially constant and may not be disturbed by the movement of the casing or of the permanent magnet.

In accordance with this invention the permanent magnet, provided with the usual soft-iron pole-piece and spool or coil, is spring-supported within the inclosing casing and is practically unattached to the said casing at its opposite ends, so that the said casing and magnet are capable of expanding and contracting without disturbing the relation of the pole-piece and diaphragm, as will be described. The instrument is further provided, in accordance with this invention, with devices by which the permanent magnet may be positioned accurately with relation to the diaphragm and by which accidental derangement of the pole-piece and diaphragm may be avoided, as when the instrument receives a blow upon the cap or mouthpiece, which blow would naturally tend, in the construction of the instrument herein shown, to bring the pole-piece into contact with the diaphragm and thereby render the instrument practically inoperative. These and other features of this invention will be pointed out in the claims at the end of this specification.

Figure 1 is a longitudinal section of a hand-phone embodying this invention, the magnet and its spool being shown in elevation; Fig. 2, a sectional view on the line 2 2, Fig. 1, looking up; Fig. 3, a sectional detail to be referred to.

Referring to Fig. 1, A represents the inclosing case of a hand-phone, which inclosing case may be of any usual or suitable construction, except that its rear end $a$ is provided with a hole or opening $a'$ of different diameters, as herein shown, to form shoulders $a^2$ $a^3$, for a purpose as will be described.

The inclosing case A is provided, as herein shown, with a mouthpiece $A'$, of any usual or suitable construction, between which and the casing A is clamped the diaphragm $a^4$, of any suitable or usual construction. The inclosing case A contains within it a permanent magnet $a^5$, of any suitable or usual construction, provided with a pole-piece $a^6$, upon which is fastened a spool $a^7$, having wound upon it the usual coil $a^8$ of wire. The permanent magnet $a^5$ has secured to its rear end an extension bar or rod $b$, which extends loosely through the opening $a'$ in the rear end $a$ of the casing A, the said extension or rod being preferably screw-threaded to receive a nut $b^2$, between which and the shoulder $a^3$ of the casing is interposed a spiral spring $b^3$, the said spring bearing at one end against the shoulder $a^3$ and at its opposite end against a washer $b^4$, fitted upon the extension or rod $b$ below the nut $b^2$.

The spring $b^3$ is designed in practice to support the permanent magnet within the inclosing casing A, and the pole-piece $a^6$ of the permanent magnet may be positioned with relation to the diaphragm $a^4$ by suitable adjusting devices, herein shown as two sets of screws, one set $c$ being adapted to be inserted into threaded sockets in the casing A and to pass loosely through a flange or projection attached to the permanent magnet, which flange or projection may be made in the form of a disk or plate $c'$, fastened to the spool $a^7$ or to the permanent magnet. The screws $c$ extend loosely through suitable holes $c^2$ in the plate $c'$ and are provided with suitable heads, against which the plate or disk $c'$ is adapted to strike when the permanent magnet and its attached plate $c'$ are moved toward the diaphragm $a^6$. In other words, the screws $c$ may be adjusted into and out of their sockets in the case A, so as to limit the movement of the pole-piece $a^6$ toward the diaphragm and thereby prevent contact of the pole-piece with the said diaphragm.

The movement of the pole-piece away from the diaphragm may and preferably will be regulated by means of adjusting-screws $c^6$, extended through the plate or disk $c'$ and engaging threaded openings in the said plate so as to practically form projections on the said plate, the screws $c^6$ abutting against a shoulder or annular flange $c^7$ in the case, as clearly shown in Fig. 1.

The casing A may be provided with the usual cap or end piece $c^{17}$, attached to the said casing by the screw $c^8$ and provided with binding-posts $c^9$, to which the ends of the magnet-coil $a^8$ are connected, as in hand-phones as now commonly constructed. The cap or end piece $c^{17}$ in accordance with this invention is provided with a socket or recess $c^{10}$ for the reception of the nut $b^2$ and in which the extension or rod $b$ may have a limited movement.

By reference to Fig. 1 it will be seen that when the hand-phone is in a vertical or upright position, with the mouthpiece A' down, the weight of the permanent magnet and its spool is sustained by the spring $b^3$, and the downward movement of the pole-piece toward the diaphragm is limited by the screws $c$. If on the other hand the instrument be inverted from the position shown in Fig. 1, the movement of the permanent magnet away from the diaphragm is limited by the adjusting-screws $c^6$. By reason of the permanent magnet being practically unattached at both ends from the inclosing casing A both the latter and the permanent magnet are free to respond to the influences of heat and cold due to climatic changes.

In practice the case or shell is more sensitive to these changes than the magnet, but the increased expansion or contraction of the shell over that of the magnet will not affect the position of the pole-piece $a^6$ with relation to the diaphragm, owing to the fact that the increased movement of the shell or case A in either direction is compensated for by the action of the spring $b^3$.

Let it be supposed that the case or shell A is expanded in the direction indicated by the arrow 20. In this case the increased movement of the case or shell A over the magnet $a^5$ will effect a compression of the spring by reason of the fact that at such time the screws $c^6$ will be in engagement with the case or shell. On the other hand, if the movement of the case or shell is a contraction in the direction opposite to that indicated by the arrow 20 the casing A in this instance tends to move away from the spring $b^3$, which latter in this case expands and follows the casing, at the same time maintaining the screws $c^6$ in engagement with the case or shell, and consequently maintaining the pole-piece in a proper position with relation to the diaphragm.

The screws $c^6$, carried by the permanent magnet, position the pole-piece with relation to the diaphragm, as above described, and, abutting against the shell or casing A, coöperate with the spring $b^3$ to maintain this position constant irrespective of the contraction and expansion of the casing A or the magnet.

The screws $c$ may be dispensed with, but I prefer to use them, for the reason that the spool end of the magnet being unattached to the casing or shell A might be moved toward the diaphragm by a sudden blow upon the mouthpiece A', which might occur in practice by bringing the mouthpiece A' into contact with a hard substance, such as a disk. The screws $c$ in such an instance would limit the movement of the pole-piece $a^6$ toward the diaphragm and prevent contact of the same.

I claim—

1. In a telephone, the combination with an inclosing casing provided with a diaphragm, of a permanent magnet provided with a front pole-piece, a spring interposed between the said casing and the said magnet and acting on the latter in a direction to move the pole-piece away from the said diaphragm, and means to limit the movement of the pole-piece away from the diaphragm, substantially as described.

2. In a telephone, the combination with an inclosing casing provided with a diaphragm, of a permanent magnet provided with a front pole-piece, a spring interposed between the said casing and the said magnet and acting on the magnet in a direction to move the pole-piece away from the said diaphragm, and means to limit the movement of the pole-piece away from the diaphragm, and means to limit the movement of the pole-piece toward the said diaphragm, substantially as described.

3. In a telephone, the combination with an inclosing case having its rear end provided with an opening, a permanent magnet within said casing provided with a front pole-piece and with an extension projecting through the opening in the rear end of the said case, a spring encircling the projecting end of the magnet within the said opening, means attached to said case against which one end of the said spring abuts, and means on the extension of the magnet against which the other end of the said spring bears, substantially as and for the purpose specified.

4. In a telephone, the combination with an inclosing case having its rear end provided with an opening, a permanent magnet within said casing provided with a front pole-piece and with an extension projecting through the opening in the rear end of the said case, a spring encircling the projecting end of the magnet within the said opening, means attached to said case against which one end of the said spring abuts, and adjustable means on the extension of the magnet against which the other end of the said spring bears, substantially as and for the purpose specified.

In testimony whereof I have signed my name to this specification in the presence of two subscribing witnesses.

JOHN WEIGEL.

Witnesses:
JAS. H. CHURCHILL,
J. MURPHY.